US012197789B2

(12) United States Patent
Sharma

(10) Patent No.: US 12,197,789 B2
(45) Date of Patent: Jan. 14, 2025

(54) USING DATA STORAGE DEVICE OPERATIONAL PROFILES FOR INTERFACE-BASED PERFORMANCE LEVELING

(71) Applicant: Western Digital Technologies, Inc., San Jose, CA (US)

(72) Inventor: Amit Sharma, Bangaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/364,785

(22) Filed: Aug. 3, 2023

(65) Prior Publication Data
US 2024/0419365 A1   Dec. 19, 2024

Related U.S. Application Data

(60) Provisional application No. 63/508,685, filed on Jun. 16, 2023.

(51) Int. Cl.
*G06F 12/00* (2006.01)
*G06F 3/06* (2006.01)

(52) U.S. Cl.
CPC ............ *G06F 3/0664* (2013.01); *G06F 3/061* (2013.01); *G06F 3/0629* (2013.01); *G06F 3/0683* (2013.01); *G06F 3/0689* (2013.01)

(58) Field of Classification Search
CPC ...... G06F 3/0664; G06F 3/061; G06F 3/0629; G06F 3/0683; G06F 3/0689
See application file for complete search history.

(56) References Cited

U.S. PATENT DOCUMENTS

| | | | |
|---|---|---|---|
| 8,156,281 B1* | 4/2012 | Grosner | G06F 3/0689 |
| | | | 711/E12.001 |
| 8,239,584 B1* | 8/2012 | Rabe | G06F 3/0605 |
| | | | 711/170 |
| 9,671,960 B2 | 6/2017 | Patel et al. | |
| 9,819,603 B2 | 11/2017 | Rector | |
| 11,531,493 B2 | 12/2022 | Vansteenkiste et al. | |
| 2013/0117475 A1* | 5/2013 | Wei | G06F 13/1694 |
| | | | 710/33 |
| 2013/0191596 A1* | 7/2013 | Benhase | G06F 12/0802 |
| | | | 711/118 |
| 2023/0147294 A1* | 5/2023 | Sreedhar | G06F 3/0635 |
| | | | 711/103 |
| 2024/0126481 A1* | 4/2024 | Krivenok | G06F 3/0673 |
| 2024/0264763 A1* | 8/2024 | Sethi | G06F 3/0689 |

\* cited by examiner

*Primary Examiner* — John A Lane
(74) *Attorney, Agent, or Firm* — Patent Law Works LLP

(57) ABSTRACT

Systems, methods, and data storage devices for using data storage device operational profiles for interface-based performance leveling are described. Data storage devices are connected to a virtual storage manager using network or storage bus connections. Comparisons of the data processing speed and interface speed of each data storage device and its connection may be used to determine an active device operational profile for each data storage device to reach a target aggregate performance. The device operational profiles may be sent to the data storage devices to change their operations, such as the handling of background processes.

20 Claims, 8 Drawing Sheets

USING DATA STORAGE DEVICE OPERATIONAL PROFILES FOR INTERFACE-BASED PERFORMANCE LEVELING

TECHNICAL FIELD

The present disclosure generally relates to storage systems supporting a plurality of hosts and, more particularly, to dynamic allocation of storage resources in response to host requests.

BACKGROUND

Multi-device storage systems utilize multiple discrete data storage devices, generally disk drives (solid-state drives (SSD), hard disk drives (HDD), hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. In some configurations, multiple such systems may contribute to a virtual storage pool supporting one or more host systems that allows capacity to be aggregated and operations distributed among the data storage devices. The data stored in the virtual storage pool may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

There is an emerging trend in the storage industry to deploy disaggregated storage. Disaggregated storage brings significant cost savings via decoupling compute and storage node life cycles and allowing different nodes or subsystems to have different compute to storage ratios. In addition, disaggregated storage allows significant flexibility in migrating compute jobs from one physical server to another for availability and load balancing purposes.

Disaggregated storage has been implemented using a number of system architectures, including the passive Just-a-Bunch-of-Disks (JBOD) architecture, the traditional All-Flash Architecture (AFA), and Ethernet Attached Bunch of Flash (EBOF) disaggregated storage, which typically uses specialized chips to translate commands from external NVMe-OF (Non-Volatile Memory Express over Fabrics) protocol to internal NVMe (NVM Express) protocol. These architectures may be configured to support various Quality of Service (QOS) metrics and requirements to support host applications, often supporting a plurality of host systems with different workload requirements.

The systems may be deployed in data centers to support cloud computing services, such as platform as a service (PaaS), infrastructure as a service (IaaS), and/or software as a service (SaaS). Data centers and their operators may offer defined (and sometime contractually guaranteed) QoS with responsive, on-demand provisioning of both hardware and software resources in multi-tenant systems. Various schemes for dynamic resource allocation may be used at different levels of the system hierarchies and roles. Prior resource allocation schemes may not provide optimal allocation of non-volatile memory resources among a plurality of hosts with differing workloads in a multi-tenant system.

In some architectures, some storage controllers and corresponding storage devices may be attached to the host complex through a peripheral or storage interface bus that provides a stable connection bandwidth, generally with a known (and comparatively short) latency. Other storage controllers and corresponding devices may be accessed over one or more networks, such as local area networks or virtual private networks over the internet. These network attached storage devices may have greater and more variable latencies based on variations in network load (which may be unrelated to the operation of the storage system itself).

Therefore, there still exists a need for storage systems able to manage data storage device performance based on different interface connections.

SUMMARY

Various aspects for using data storage device operational profiles for interface-based performance leveling are described. More particularly, a virtual storage manager may use a set of device operational profiles for each data storage device and reconfigure them based on different interface and processing speed combinations responsive to network load.

One general aspect includes a system that includes: a processor; a memory; a plurality of interface connections to a plurality of data storage devices, where each data storage device of the plurality of data storage devices is configured with a data processing speed, an interface speed, and a background process load. The system also includes a virtual storage manager configured to: determine, based on a comparison of the data processing speed and the interface speed of each data storage device of the plurality of data storage devices, an active device operational profile for each data storage device of the plurality of data storage devices; and send, to each data storage device of the plurality of data storage devices, the active device operational profile, where each data storage device of the plurality of data storage devices is configured to change at least one operating parameter responsive to the active device operational profile for that data storage device.

Implementations may include one or more of the following features. The at least one operating parameter changed based on the active device operational profile may modify the background process load of that data storage device during an operating period of the active device operational profile. The at least one operating parameter changed may be a threshold value for triggering background operations. The first set of data storage devices from the plurality of data storage devices may be configured for connection, through a first network, to a network interface of the plurality of interface connections; a second set of data storage devices from the plurality of data storage devices may be configured for connection, through a storage interface bus, to a storage interface of the plurality of interface connections; the interface speed of each data storage device in the first set of data storage devices may be based on a network load of the first network; and the interface speed of each data storage device in the second set of data storage devices may be based on a storage interface speed of a storage bus interface of that data storage device. The virtual storage manager may be further configured to determine, based on a network speed model, the interface speed of each data storage device in the first set of data storage devices. The virtual storage manager may be further configured to: determine, for each data storage device of the plurality of data storage devices; at least two device operational profiles selected from a high performance profile and a maintenance profile; and determine, for each device operational profile of each data storage device, a predicted data processing speed for that data storage device using that device operational profile. Determining the active device operational profile for each data storage device of the plurality of data storage devices may be based on the predicted data processing speed for that data storage device using that device operational profile. The virtual storage manager may be further configured to: determine a target aggregate performance value for the plurality of data storage devices; determine, for each data storage device of the plurality of data storage devices, a predicted throughput value based on the interface speed and the predicted data processing speed; and select the active device operational profiles for an operating period such that an aggregate predicted throughput value for the plurality of data storage devices meets the target aggregate performance value. The virtual storage manager may be further configured to: determine, for an operating period, a network load above a network threshold impacting the interface speeds of a first set of data storage devices of the plurality of data storage devices; determine, for the operating period, a second set of data storage devices of the plurality of data storage devices configured for connection, through a storage interface bus, to a storage interface of the plurality of interface connections; select the maintenance profile as the active device operational profile for the first set of data storage devices; and select the high performance profile as the active device operational profile for the second set of data storage devices. The virtual storage manager may be further configured to: determine, for an operating period, a network load below a network threshold impacting the interface speeds of a first set of data storage devices of the plurality of data storage devices; determine, for the operating period, a second set of data storage devices of the plurality of data storage devices configured for connection, through a storage interface bus, to a storage interface of the plurality of interface connections; select the maintenance profile as the active device operational profile for the second set of data storage devices; and select the high performance profile as the active device operational profile for the first set of data storage devices. The system may further include the plurality of data storage devices, where each data storage device may include a non-volatile storage medium and a controller configured to: receive a device operational profile command indicating the active device operational profile; determine, based on the active device operational profile and a prior device operational profile, the at least one operating parameter to change; change the at least one operating parameter; and send a response to the device operation profile command confirming the active device operational profile.

Another general aspect includes a computer-implemented method that includes: configuring each data storage device of a plurality of data storage devices in a virtual storage pool, where each data storage device has a corresponding data processing speed, interface speed, and background process load; determining, based on a comparison of the data processing speed and the interface speed of each data storage device of the plurality of data storage devices, an active device operational profile for each data storage device of the plurality of data storage devices; sending, to each data storage device of the plurality of data storage devices, the active device operational profile; and changing, by each data storage device of the plurality of data storage devices, at least one operating parameter responsive to the active device operational profile for that data storage device.

Implementations may include one or more of the following features. The computer-implemented method may include, for each data storage device of the plurality of data storage devices, modifying, responsive to the at least one operating parameter changed based on the active device operational profile for that data storage device, the background process load of that data storage device during an operating period of the active device operational profile. The computer-implemented method may include: configuring a first set of data storage devices from the plurality of data storage devices for connection to a host system, through a first network, to a network interface for receiving host storage commands, where the interface speed of each data storage device in the first set of data storage devices is based on a network load of the first network; and configuring a second set of data storage devices from the plurality of data storage devices are configured for connection to a host storage system, through a storage interface bus, to a storage interface for receiving host storage commands, where the interface speed of each data storage device in the second set of data storage devices is based on a storage interface speed of a storage bus interface of that data storage device. The computer-implemented method may include determining, based on a network speed model, the interface speed of each data storage device in the first set of data storage devices. The computer-implemented method may include: determining, for each data storage device of the plurality of data storage devices; at least two device operational profiles selected from a high performance profile and a maintenance profile; and determining, for each device operational profile of each data storage device, a predicted data processing speed for that data storage device using that device operational profile, where determining the active device operating profile for each data storage device of the plurality of data storage devices is based on the predicted data processing speed for that data storage device using that device operational profile. The computer-implemented method may include: determining a target aggregate performance value for the plurality of data storage devices; determining, for each data storage device of the plurality of data storage devices, a predicted throughput value based on the interface speed and the predicted data processing speed; and selecting the active device operational profiles for an operating period such that an aggregate predicted throughput value for the plurality of data storage devices meets the target aggregate performance value. The computer-implemented method may include: determining, for an operating period, a network load above a network threshold impacting the interface speeds of a first set of data storage devices of the plurality of data storage devices; determining, for the operating period, a second set of data storage devices of the plurality of data storage devices configured for connection, through a storage interface bus, to a storage interface; selecting the maintenance profile as the active device operational profile for the first set of data storage devices; and, selecting the high performance profile as the active device operational profile for the second set of data storage devices. The computer-implemented method may include: determining, for an operating period, a network load below a network threshold impacting the interface speeds of a first set of data storage devices of the plurality of data storage devices; determining, for the operating period, a second set of data storage devices of the plurality of data storage devices configured for connection, through a storage interface bus, to a storage interface; selecting the maintenance profile as the active device operational profile for the second set of data storage devices; and, selecting the high performance profile as the active device operational profile for the first set of data storage devices. The computer-implemented method may include: receiving, by each data storage device of the plurality of data storage devices, a device operational profile command indicating the active device operational profile; determining, by each data storage device of the plurality of data storage devices, the at least one operating parameter to change based on the active device operational profile and a prior device operational profile; changing, by each data storage device of the plurality of data storage devices, the at least one operating parameter; and sending, by each data storage device of the plurality of data storage devices, a response to the device operation profile command confirming the active device operational profile.

Still another general aspect includes a storage system that includes: a processor; a memory; a plurality of data storage devices; a plurality of interface connections to the plurality of data storage devices, where each data storage device of the plurality of data storage devices is configured with a data processing speed, an interface speed, and a background process load; means for determining, based on a comparison of the data processing speed and the interface speed of each data storage device of the plurality of data storage devices, an active device operational profile for each data storage device of the plurality of data storage devices; means for sending, to each data storage device of the plurality of data storage devices, the active device operational profile; and means for changing, by each data storage device of the plurality of data storage devices, at least one operating parameter responsive to the active device operational profile for that data storage device.

The various embodiments advantageously apply the teachings of data storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve performance across devices in a storage pool, such as by using device operational profiles and network load to proactively manage storage device performance. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
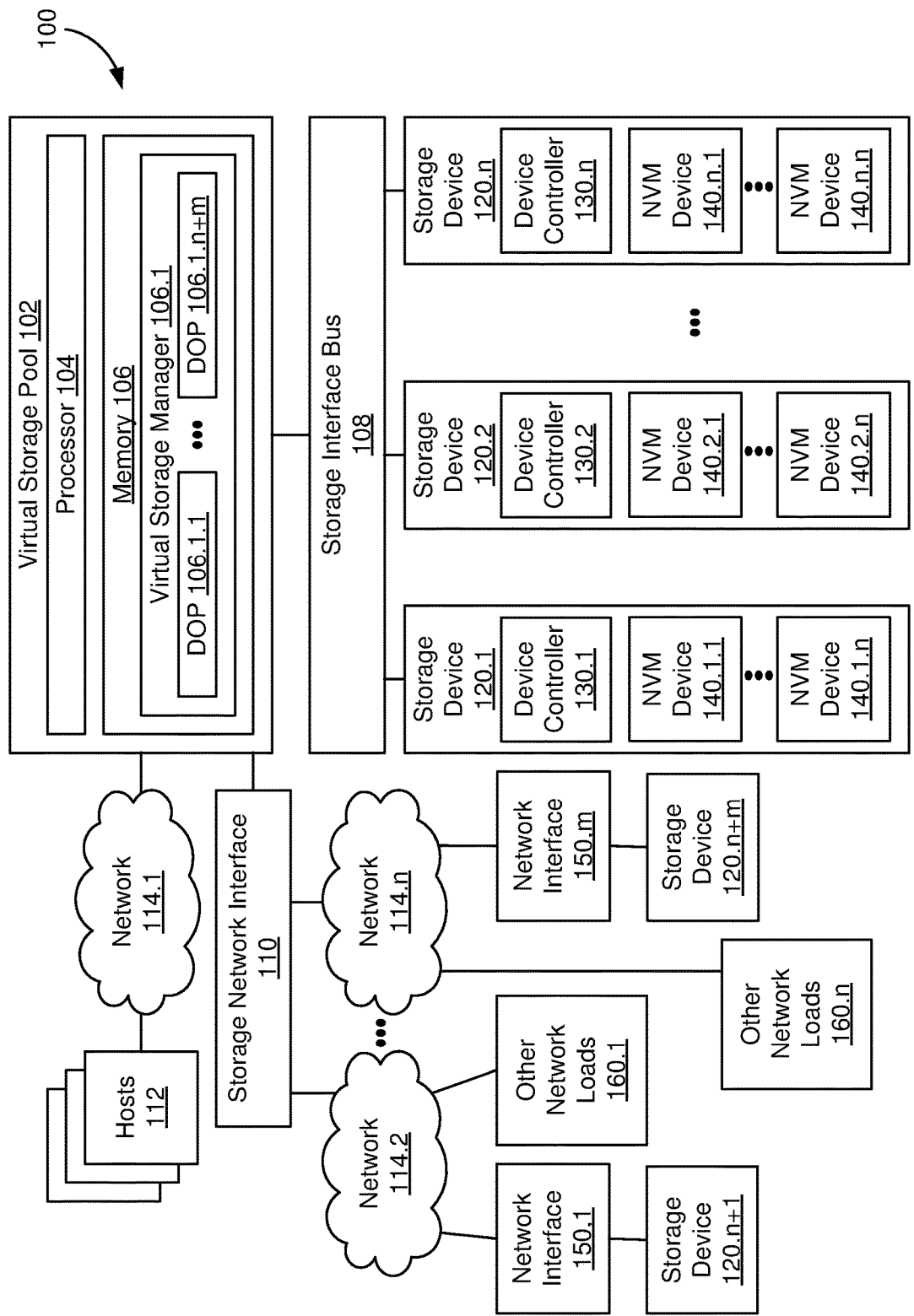
FIG. 1 schematically illustrates a virtual storage pool system supporting a plurality of host systems.

FIG. 1 shows an embodiment of an example data storage system 100 with multiple data storage devices 120 supporting a plurality of host systems 112 through virtual storage pool 102. While some example features are illustrated, various other features have not been illustrated for the sake of brevity and so as not to obscure pertinent aspects of the example embodiments disclosed herein. To that end, as a non-limiting example, data storage system 100 may include one or more data storage devices 120 (also sometimes called information storage devices, storage devices, disk drives, or drives) configured in one or more storage nodes with virtual storage pool 102. In some configurations, virtual storage pool 102 may be configured as a server system supporting the storage requests of hosts 112 through network 114.1. In some embodiments, storage devices 120 may be configured in one or more servers, storage array blades, all flash array appliances, or similar storage unit for use in data center storage racks or chassis. Storage devices 120 may interface with one or more host nodes or host systems 112 and provide data storage and retrieval capabilities for or through those host systems through virtual storage pool 102. In some embodiments, storage devices 120 may be configured in a storage hierarchy that includes storage nodes, storage controllers (such as storage controller 102), and/or other intermediate components between storage devices 120 and host systems 112. For example, each storage controller may be responsible for a corresponding set of storage devices 120 in a storage node and their respective storage devices may be connected through a corresponding internal bus architecture including storage interface bus 108 or through a network (e.g., network 114.2-114.n) and storage network interface 110.

In the embodiment shown, a number of storage devices 120.1-120.n are attached to a common storage interface bus 108 for host communication through virtual storage pool 102. For example, storage devices 120 may include a number of drives arranged in a storage array, such as storage devices sharing a common rack, unit, or blade in a data center or the SSDs in an all flash array. Storage devices 120.1-120.n may be referred to as local storage devices because they are connected to virtual storage pool 102 by a peripheral interface bus, such as a peripheral component interface express (PCIe) bus, and corresponding physical interfaces and switches. In some embodiments, storage devices 120 may share a backplane network, network switch(es), and/or other hardware and software components accessed through storage interface bus 108. For example, storage devices 120 may connect to storage interface bus 108 through a plurality of physical port connections that define physical, transport, and other logical channels for establishing communication with the different components and subcomponents for establishing a communication channel to virtual storage pool 102.

In the embodiment shown, a number of storage devices 120.*n*+1-120.*n*+m are attached through one or more networks 114.2-114.*n* to storage network interface 110 for host communication through virtual storage pool 102. For example, storage devices 120 may include a number of drives arranged in other servers or storage arrays sharing a LAN connection, internet connection, or similar network connection with storage network interface 110. While single storage devices 120.*n*+1 and 120.*n*+m are shown, these network storage devices may include storage nodes configured similarly to storage devices 120.1-120.*n* with multiple storage devices and corresponding storage controllers, storage interface bus or backplane network, switches, etc. Storage devices 120.*n*+1-120.*n*+m may include or connect to network interface 150.1-150.*m* for connection through networks 114.2-114.*n*. For example, storage devices 120.*n*+1-120.*n*+m may include network attached storage devices including onboard network interfaces, connect to a storage network interface adapter, or be part of a storage node with a storage controller that includes or connects to network interfaces 150. Storage devices 120.*n*+1-120.*n*+m may be referred to as network storage devices because they are connected to virtual storage pool 102 through a network (e.g., networks 114.2-114.*n*) that supports other network loads 160 and passes storage commands through general network standards, such as internet protocols (IP), instead of or in addition to peripheral interface connections similar to storage devices 120.1-120.*n*.

In some embodiments, data storage devices 120 are, or include, solid-state drives (SSDs). Each data storage device 120 may include a non-volatile memory (NVM) or device controller 130 based on compute resources (processor and memory) and a plurality of NVM or media devices 140 as a non-volatile storage medium for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108. In some configurations, storage devices 120 may be configured for direct memory access using one or more protocols, such as non-volatile memory express (NVMe), remote direct memory access (RDMA), NVMe over fabric (NVMeOF), etc., to provide command messaging and data transfer to host systems 112 through virtual storage pool 102.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controllers. In some embodiments, device controllers 130 may include firmware for controlling data written to and read from media devices 140, one or more storage (or host) interface protocols for communication with other components, as well as various internal functions, such as garbage collection, wear leveling, media scans, and other memory and data maintenance. For example, device controllers 130 may include firmware for running the NVM layer of an NVMe storage protocol alongside media device interface and management functions specific to the storage device. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, storage system 100 may include multiple networks interconnecting various components of the storage system. For example, hosts 112 may communicate with virtual storage pool 102 through network 114.1, storage device 120.n+1 may communicate with virtual storage pool 102 through network 114.2, and storage device 120.n+m may communicate with virtual storage pool 102 through network 114.n. In some embodiments, host systems 112 are coupled to data storage system 100 through network 114.1, which may be configured as a fabric network, and storage network interface 110 may support communications with multiple host systems 112 in addition to storage devices 120.n+1-120.n+m. Networks 114 may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. In some configurations, each network 114 may have different network load characteristics and differing levels of network traffic. For example, network traffic on network 114.2 may include a combination of storage network traffic to storage device 120.n+1 and other network traffic to other network loads 160.1, such as other server or computing systems on the same LAN or more general internet traffic for use of public internet networks. Network traffic on network 114.n may be different than network traffic on network 114.2 and include different network loads 160.n.

Host systems 112, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host systems 112 are sometimes called a host, client, or client system. In some embodiments, host systems 112 are server systems, such as a server system in a data center. In some embodiments, the one or more host systems 112 are one or more host devices distinct from a storage node housing the plurality of storage devices 120 and/or storage controller 102. In some embodiments, host systems 112 may include a plurality of host systems owned, operated, and/or hosting applications belonging to a plurality of entities and supporting one or more quality of service (QOS) standards for those entities and their applications. Host systems 112 may be configured to store and access data in the plurality of storage devices 120 in a multi-tenant configuration with shared storage resource pools, such as host connections to namespaces defined in storage devices 120. In some configurations, host systems 112 may include one or more virtual machines mapped to storage resources in virtual storage pool 102.

Virtual storage pool 102 may be hosted on a computer system that includes one or more central processing units (CPUs) or processors 104 for executing compute operations, storage management operations, and/or instructions for accessing storage devices 120 through storage interface bus 108. In some embodiments, processors 104 may include a plurality of processor cores which may be assigned or allocated to parallel processing tasks and/or processing threads for different storage operations and/or host storage connections. In some embodiments, processor 104 may be configured to execute fabric interface for communications through networks 114 and/or storage interface protocols for communication through storage interface bus 108. In some embodiments, a separate network interface unit and/or storage interface unit (not shown) may provide the network interface protocol and/or storage interface protocol and related processor and memory resources.

Virtual storage pool 102 may be hosted on a computer system that includes a memory 106 configured to support a virtual storage manager 106.1 that manages virtual storage connections between hosts 112 and storage devices 120. For example, virtual storage manager 106.1 may dynamically map host storage connections based on connection requests to namespaces defined in storage devices 120 and allocate command queues for submission of host storage commands and completion of those host storage commands by storage devices 120. Virtual storage manager 106.1 may maintain information about storage device locations and connections, as well as handling interactions with storage devices 120 in storage system 100. Virtual storage manager 106.1 may be configured to use device operational profiles (DOPs) 106.1.1-106.1.n+m for managing the operating parameters of storage devices 120. For example, virtual storage manager 106.1 may maintain an active DOP for each storage device 120 during any operating period of storage system 100 and may change DOPs in response to changes or predicted changes in networks 114.2-114.m that may impact the interface speeds of storage devices 120.n+1-120.n+m. In some embodiments, memory 106 may include one or more dynamic random access memory (DRAM) devices for use by storage devices 120 for command, management parameter, and/or host data storage and transfer. In some embodiments, storage devices 120 may be configured for direct memory access (DMA), such as using remote direct memory access (RDMA) protocols, over storage interface bus 108 and/or storage network interface 110.

While local connections through storage interface bus 108 may have predictable interface speeds to support the full processing speed capabilities of storage devices 120.1-120.n, network connections may have variable loads and resulting interface speeds for storage devices 120.n+1-120.n+m. More specifically, reduced interface speeds through networks 114.2-114.n may reduce the effective throughput of storage devices 120.n+1-120.n+m as their interface speeds become a gating parameter to their throughput and access to their storage processing speeds by virtual storage pool 102. As other network loads 160.1-160.n increase, available network bandwidth for storage devices 120.n+1-120.n+m may decrease, impacting the aggregate performance of storage system 100 and potentially causing it to fluctuate and fall below an aggregate throughput threshold needed to support defined service levels, such as service level agreements, for hosts 112. Management of DOPs by virtual storage manager 106.1 may be used to account for fluctuations in network loads by changing the operating parameters of the data storage devices and directing data distribution to achieve predictable host storage command throughput. For example, by directing storage devices 120 to use selected DOPs, depending on network load, slow interfaces and fast interfaces may be balanced during particular operating periods to achieve higher and/or more consistent performance.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2A:
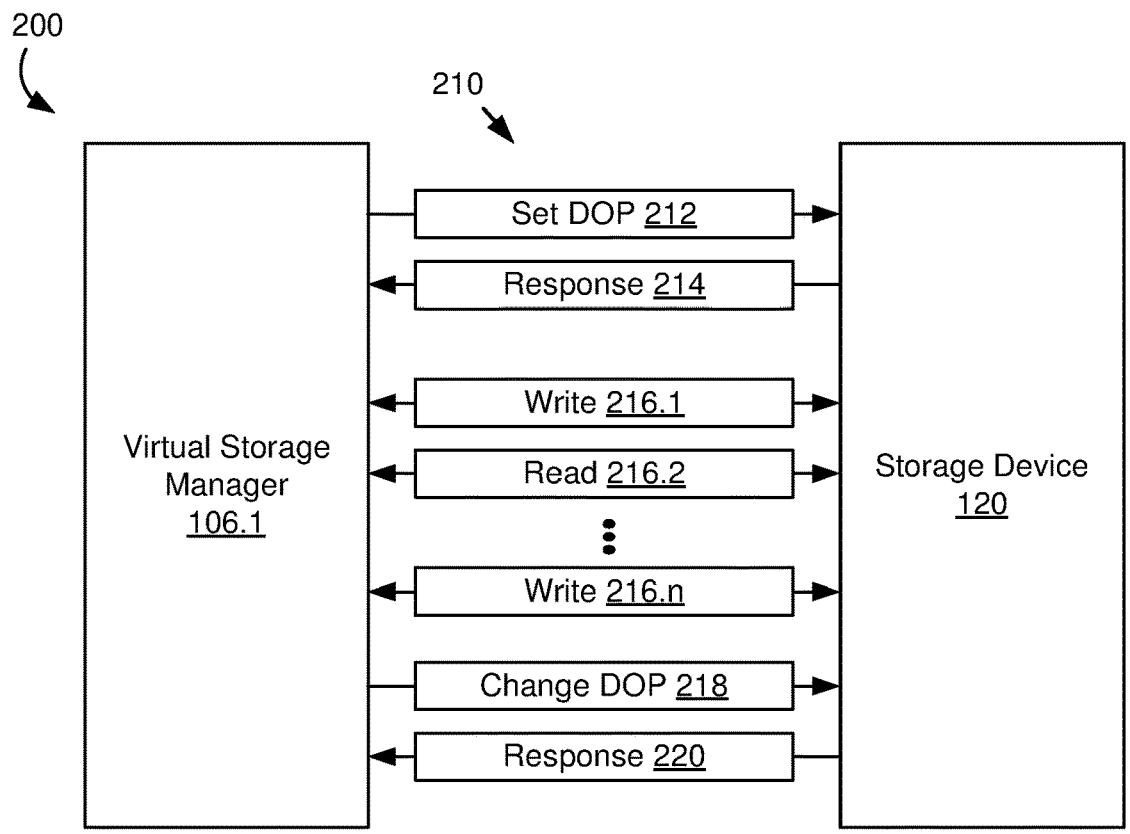
FIG. 2A schematically illustrates an example storage system for using device operational profiles.

FIG. 2A shows schematic representations of an example storage system 200, such as components of storage system 100 in FIG. 1. As described above, virtual storage manager 106.1 may be configured for communication with storage device 120 over a local storage bus interface or a network interface. Virtual storage manager 106.1 may instruct storage devices 120 to make them operate in a certain DOP in response to a current or predicted network load. In some configurations, virtual storage manager 106.1 and storage device 120 may each be configured with a set of DOPs for that storage device and command messaging between virtual storage manager 106.1 and storage device 120 may be used to determine an active DOP for storage device 120 during any operating period of storage system 200. For example, virtual storage manager 106.1 may define a set of DOP commands that may be sent storage device 120 to set and change the active DOP of that storage device.

In some configurations, the storage interface protocol used for communication between virtual storage manager 106.1 and storage device 120 may support storage management commands that are distinct from host storage commands and may allow virtual storage manager 106.1 to manage configuration pages, operating states, power states, and other operations of storage device 120 aside from processing storage commands for host system input/output (I/O). DOP commands may be an extension of this storage management command set. For example, DOP commands may be based on a configuration change command and include a DOP identifier parameter in the configuration change command indicating the next active DOP to be used by storage device 120. In some configurations, a DOP identifier parameter may be included in host storage commands and a host command handler in storage device 120 may parse the DOP identifier parameter from each host storage command to compare with a current DOP identifier for the operating state of that storage device. If the received DOP identifier is different than the current DOP identifier, storage device 120 may update its operating parameters for the received DOP and initiate it as the new current DOP for a next operating period (until another DOP identifier parameter change occurs).

In the example shown, a set of commands and responses 210 pass between virtual storage manager 106.1 and storage device 120. For example, the example commands and responses 210 may include DOP commands for setting and changing the active DOP, as well as host storage commands that are directed to the storage device during the operating period for the initial DOP before the DOP change. Set DOP command 212 may be sent from virtual storage manager 106.1 to storage device 120 to set or initialize an active DOP for that storage device for a next operating period. Response 214 may be sent from storage device 120 to virtual storage manager 106.1 to confirm receipt and change of the operating state to reflect the DOP in the set DOP command. Once the DOP is set for storage device 120, that storage device may process any number of host storage commands 216 from any number of hosts. For example, write command 216.1, read command 216.2, and any number of additional commands through write command 216.n may be received through virtual storage manager 106.1 by storage device 120. Storage device 120 may process those host storage commands 216 and return corresponding completion messages and/or host data from the storage medium of storage device 120. At a later time, virtual storage manager 106.1 may send a change DOP command 218 to initiate a next operating period with a different active DOP. For example, responsive to a detected or predicted change in network load and access speed for network storage devices, virtual storage manager 106.1 may send a new DOP to each storage device in an attempt to maintain a threshold throughput level across the storage system in a new operating period. Response 220 may be sent from storage device 120 to virtual storage manager 106.1 to confirm receipt and change of the operating state to reflect the DOP in the set DOP command. In some configurations, storage device 120 may not be able to comply with the new DOP, such as due to a critical background operations state, and response 220 may include a rejection of change DOP command 218.

Figure 2B:
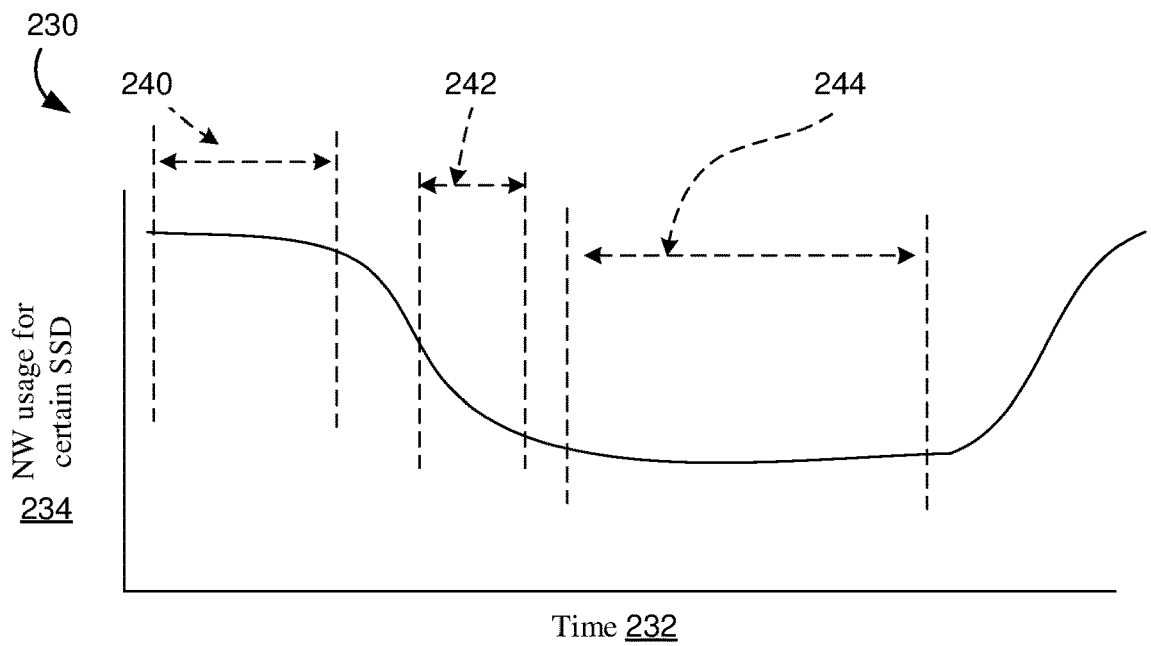
FIG. 2B is a graph of network load triggering the use of different device operational profiles.

FIG. 2B shows an example graph 230 of network usage or load over time and indicates different example operating periods 240, 242, and 244. In graph 230, the x axis is time 232 and each operating period may have a start time and an end time indicated by the vertical dashed lines. The y axis is network (NW) usage 234 for a storage device, such as a certain SSD, such that graph 230 shows the network load, which is an inverse of the expected interface speed for the storage device. For example, the higher network usage 234, the lower the expected interface speed or bandwidth of the network storage device.

During operating period 240, the network usage may be high, such as higher than network threshold that reduces the interface speed of the storage device. During high network usage, network storage devices I/O may be reduced and/or fluctuating. The virtual storage manager may respond to such a network condition by sending DOP commands to the network storage devices to place them in a default slow DOP and/or another relatively low throughput DOP and may reduce host commands to the network storage devices to support the slow DOP. Local storage devices may be sent DOP commands to place them in an accelerated or high performance DOP to compensate for the reduced throughput of the network storage devices.

During operating period 242, the network usage may be transitioning from a high usage (above a high load network threshold) to a low usage (below a low load network threshold). During the transitional operating period, the network usage is still above the low load threshold and the virtual storage manager may prepare the network storage devices for taking on an increased workload. For example, the network storage devices may receive a maintenance DOP command to accelerate maintenance operations, such as garbage collection and freeing up of SLC capacity for high performance operation. Local storage devices may continue with or be changed to a high performance DOP to maintain aggregate throughput across the storage system.

During operating period 244, the network usage may drop below a low load network threshold. Due to the prior high performance operation of the local storage devices that may have included suppression of background operations, the virtual storage manager may place the local storage devices in a maintenance DOP or other low performance DOP to perform internal management. The network storage devices may now be placed in high performance DOP to both take advantage of the availability of a higher interface speed and to compensate for lowering the performance of the local storage devices. If the low network usage continues, the local storage devices may complete their background operations and the virtual storage manager may initiate a new operating period where both the network storage devices and local storage devices are placed into default operating modes until another change in network usage is determined. For example, a transition to higher network load may trigger an inverse of operating period 242 where the local storage devices are placed back in maintenance DOP to prepare for the next high performance DOP when the network usage again meets or exceeds the high load network threshold.

Figure 3:
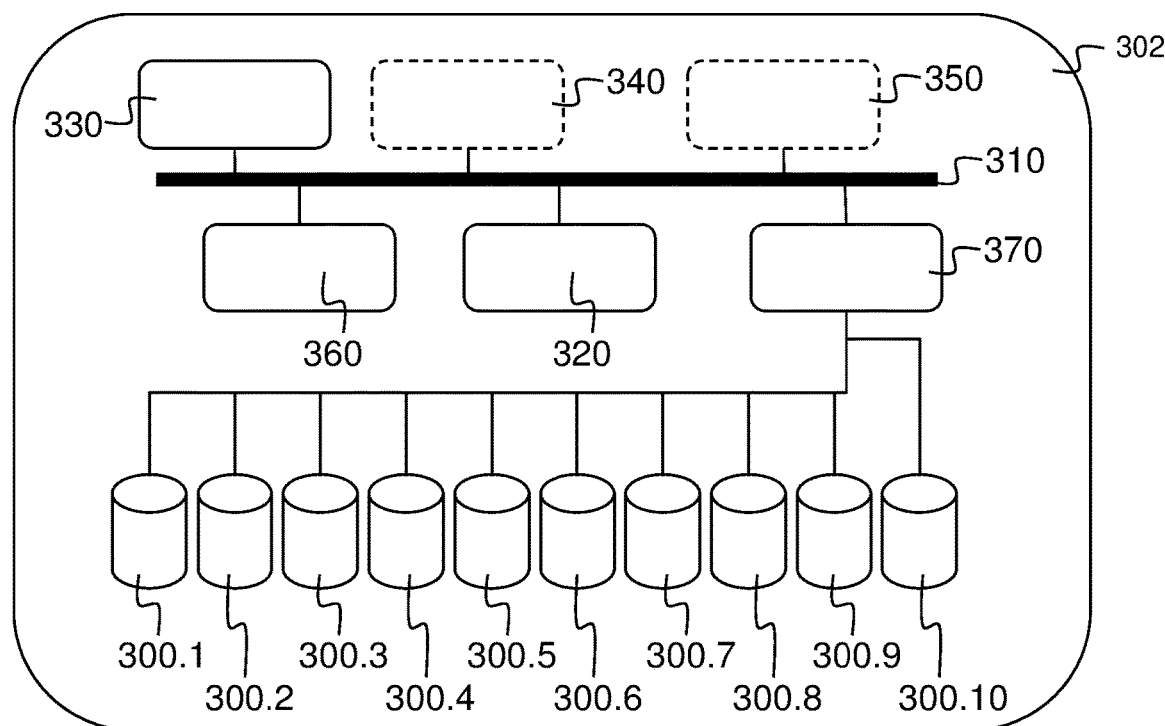
FIG. 3 schematically illustrates a storage node of the multi-device storage system of FIG. 1.

FIG. 3 shows a schematic representation of a storage node 302. For example, storage controller 102 may be configured as a storage node 302 for accessing storage devices 120 as storage elements 300. Storage node 302 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller, backplane management controller, network interface controller, or host bus interface controller, such as storage controller 102. Bus 310 may include one or more conductors that permit communication among the components of storage node 302. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 302, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 302 to communicate with other devices and/or systems, for example mechanisms for communicating with other storage nodes 302 or host systems 112. Storage element interface 370 may comprise a storage interface, such as a Serial Advanced Technology Attachment (SATA) interface, a Small Computer System Interface (SCSI), serial attached SCSI (SAS), peripheral computer interface express (PCIe), etc., for connecting bus 310 to one or more storage elements 300, such as one or more storage devices 120, for example, 2 terabyte (TB) NVMe solid state drives (SSDs), and control the reading and writing of data to/from these storage elements 300. As shown in FIG. 3, such a storage node 302 could comprise ten 2 TB NVMe disk drives as storage elements 300.1-300.10 and, in this way, storage node 302 would provide a storage capacity of 20 TB to the storage system 100.

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
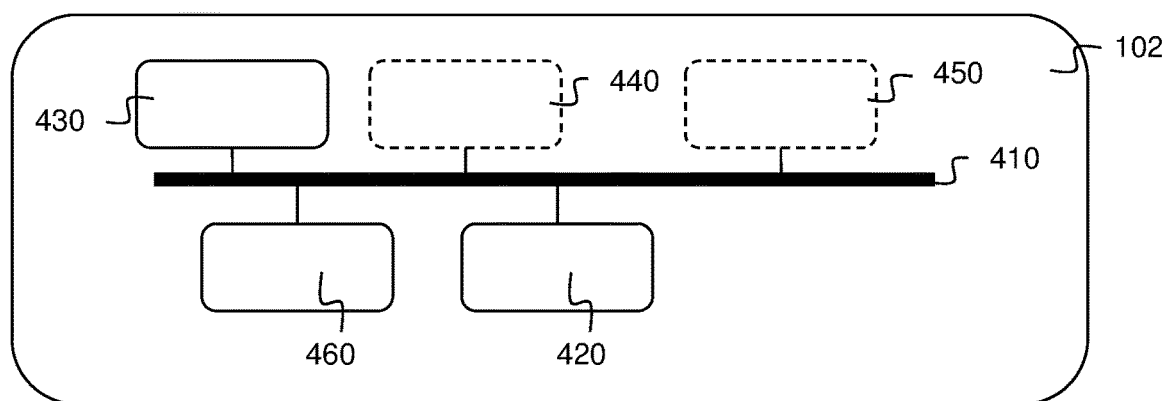
FIG. 4 schematically illustrates a host node of the multi-device storage system of FIG. 1.

FIG. 4 shows a schematic representation of an example host system 112. Host system 112 may comprise a bus 410, a processor 420, a local memory 430, one or more optional input units 440, one or more optional output units 450, and a communication interface 460. Bus 410 may include one or more conductors that permit communication among the components of host 112. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to host 112 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 112 to communicate with other devices and/or systems.

Figure 5:
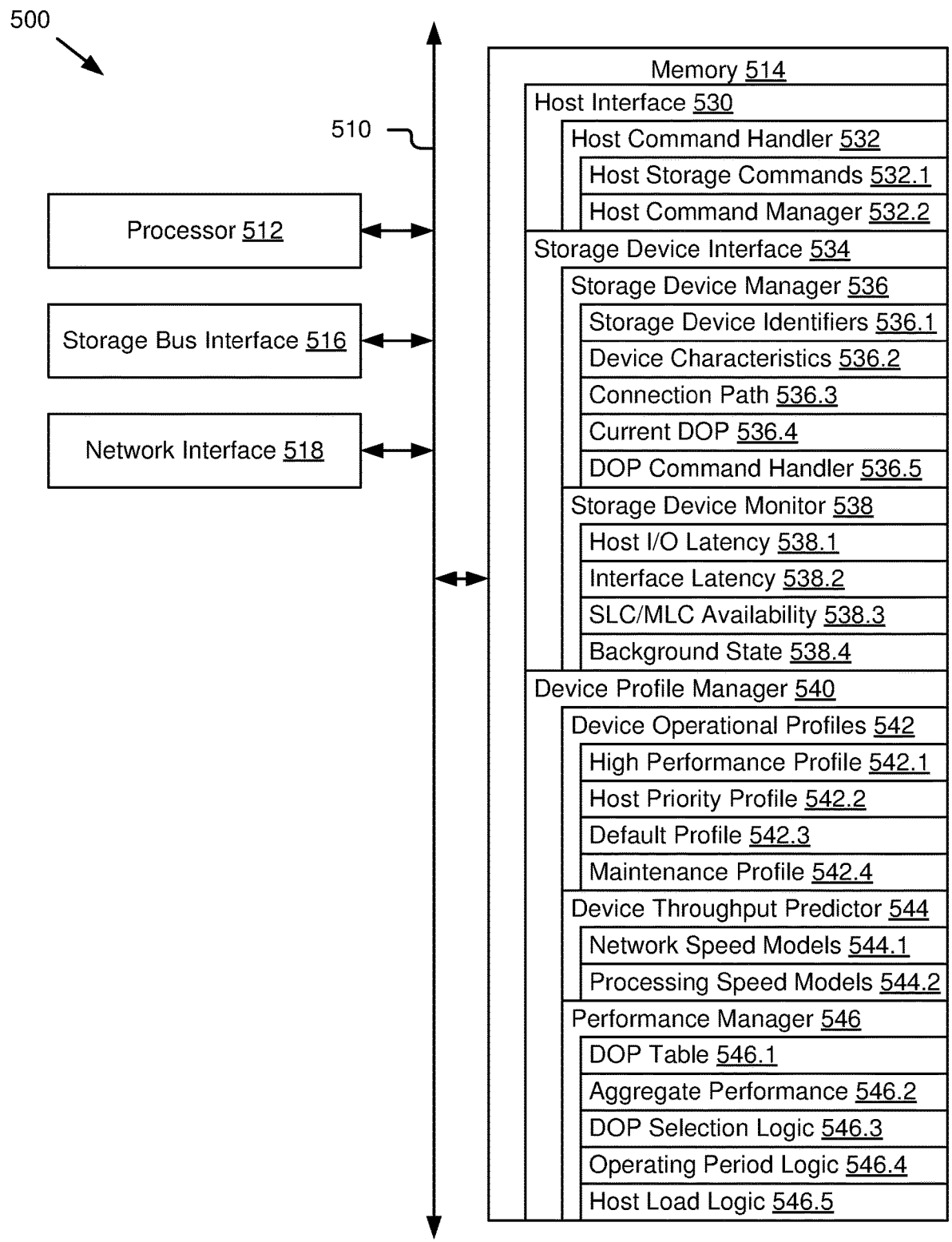
FIG. 5 schematically illustrates some elements of the storage node of FIG. 1-3 in more detail.

FIG. 5 schematically shows selected modules of a storage node 500 configured for virtual storage management using DOPs. Storage node 500 may incorporate elements and configurations similar to those shown in FIGS. 1-2. For example, storage node 500 may be configured as virtual storage pool 102 managing a plurality of storage devices 120 supporting host connection requests and storage operations from host systems 112.

Storage node 500 may include a bus 510 interconnecting at least one processor 512, at least one memory 514, and at least one interface, such as storage bus interface 516 and network interface 518. Bus 510 may include one or more conductors that permit communication among the components of storage node 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage bus interface 516 may include a physical interface for connecting to one or more data storage devices using an interface protocol that supports storage device access. For example, storage bus interface 516 may include a PCIe or similar storage interface connector supporting NVMe access to solid state media comprising non-volatile memory devices 520. Network interface 518 may include a physical interface for connecting to a one or more networks via a network interface. For example, network interface 518 may include an ethernet connection to a host bus adapter, network interface, or similar network interface connector supporting NVMe host connection protocols, such as RDMA and transfer control protocol/internet protocol (TCP/IP) connections. In some embodiments, network interface 518 may support NVMeoF or similar storage interface protocols.

Storage node 500 may include a plurality of modules or subsystems that are stored and/or instantiated in memory 514 for execution by processor 512 as instructions or operations. For example, memory 514 may include a host interface 530 configured to receive, process, and respond to host connection and data requests from client or host systems. Memory 514 may include a storage device interface 534 configured for storage device management and monitoring. Memory 514 may include a device profile manager 540 configured to manage DOPs across the data storage devices in a virtual storage pool. In some configurations, host interface 530, storage device interface 534, and/or device profile manager 540 may be instantiated in a virtual storage manager operating on a hardware controller of storage node 500.

Host interface 530 may include an interface protocol and/or set of functions and parameters for receiving, parsing, responding to, and otherwise managing requests from host nodes or systems. For example, host interface 530 may include functions for receiving and processing host requests for establishing host connections with one or more volumes or namespaces stored in the storage devices of the virtual storage pool for reading, writing, modifying, or otherwise manipulating data blocks and their respective client or host data and/or metadata in accordance with host communication and storage protocols. In some embodiments, host interface 530 may enable direct memory access and/or access over NVMe protocols, such as RDMA and TCP/IP access, through network interface 518 and storage bus interface 516 to host data units stored in the data storage devices. For example, host interface 530 may include host communication protocols compatible with ethernet and/or another host interface that supports use of NVMe and/or RDMA protocols for data access to host data. Host interface 530 may further include host communication protocols compatible with accessing storage node and/or host node resources, such memory buffers, processor cores, queue pairs, and/or specialized assistance for computational tasks. Host interface 530 may include a storage interface protocol configured to comply with the physical, transport, and storage application protocols supported by the host for communication through network interface 518 and/or storage bus interface 516.

In some embodiments, host interface 530 may include a plurality of hardware and/or software modules configured to use processor 512 and memory 514 to handle or manage defined operations of host interface 530. For example, host interface 530 may include a host command handler 532 configured to receive host storage commands to a particular host connection. In some embodiments, host interface 530 may include additional modules (not shown) for establishing host connections to partitions or namespaces, buffer management, and other host-side functions.

Host command handler 532 may include interfaces, functions, parameters, and/or data structures to receive host storage commands 532.1 and direct them to storage devices in the virtual storage pool. This may include management of both host connections to namespaces and how those namespaces are allocated among the backend storage devices. For example, host command handler 532 may include a host command manager 532.2 configured to allocate namespaces among data storage devices and manage host connections with those namespaces to control the flow of host storage operations 532.1. In some configurations, host command manager 532.2 may allocate host connections to command queues associated with a particular namespace and storage device associated with that namespace. Host command manager may operate in conjunction with storage device interface 534 and device profile manager 540 to support performance management and, more specifically, allocation of host storage commands 532.1 that can be processed according to the current DOPs of the various storage devices in the virtual storage pool. For example, host command manager 532.2 may use host connections to control the volume of host storage commands likely to be received by each storage device. In some configurations, host command manager 532.2 may allocate host connections and/or terminate host connections to support various anticipated processing speeds and volumes for different storage devices having different DOPs. For example, a storage device with a high performance DOP may receive more host connections than a storage device with a host priority or default DOP. A storage device with a maintenance DOP may have all host write connections terminated to maximize the processing resources for completing background operations.

Storage device interface 534 may include an interface protocol and set of functions, parameters, and data structures for managing the data storage devices in the virtual storage pool and the backend connections to those storage devices. For example, storage device interface 534 may be configured to maintain a storage device connection to each storage device through storage bus interface 516 or network interface 518. For example, at least one set of local storage devices may be connected to the virtual storage pool through storage bus interface 516 and at least one set of network storage devices may be connected to the virtual storage pool through network interface 518. Storage device interface 534 may support the allocation of host connections and host storage commands by host command handler 532 and may support the use of DOPs from device profile manager 540 to manage operational configurations of the storage devices, along with other configuration and storage device management functions. Storage device interface 534 may include a storage interface protocol configured to comply with the physical, transport, and storage application protocols supported by the storage devices for communication over storage bus interface 516 and/or network interface 518.

In some embodiments, storage device interface 534 may include a plurality of hardware and/or software modules configured to use processor 512 and memory 514 to handle or manage defined operations of storage device interface 534. For example, storage device interface 534 may include a storage device manager 536 configured to manage storage device profiles and management commands to the storage devices in compliance with the storage interface protocols. For example, storage device interface 534 may include or interface with a storage device monitor 538 configured to monitor one or more operating parameters of the data storage devices.

Storage device manager 536 may include interfaces, functions, parameters, and/or data structures to manage the storage device characteristics, connections, and configuration/management commands. Storage device manager 536 may manage a plurality of storage devices, such the set of storage devices available in the virtual storage pool. For example, storage device manager 536 may be configured for at least one set of local storage devices and at least one set of network storage devices. The storage devices in the storage pool may include multiple storage nodes available through local connections and multiple sets of network storage devices associated with different networks with different network capacities and loads. Storage device manager 536 may be configured to manage any number of storage devices. In some embodiments, storage device manager 536 may include a data structure containing storage device identifiers 536.1 and configuration parameter fields for each storage device, such as slot/port and/or other addressing information, device type, capacity, number of supported queue-pairs, I/O queue depth, etc. For example, device characteristics 536.2 may include fields for storage capacity, interface type, processing speed (e.g., an I/O per second (IOPS) benchmark or rating for the device), supported namespaces and host queues, and similar parameters for describing a storage device model or configuration. Connection path 536.3 may include fields for one or more connection identifiers and/or addressing information for the storage device, such as port/slot identifiers for storage devices connected through storage bus interface 516 and network addresses for a device-side network interface for storage devices connected through network interface 518. In some configurations, connection path 536.3 may include connection speed base values and/or range values for the connection to that storage device.

Storage device manager 536 may support device profile manager 540 for setting and monitoring DOPs for the storage devices being managed. For example, the data structure for managing parameters of the various storage devices may include a field for the current DOP 536.4 of that data storage device that stores a DOP identifier for the current DOP of each storage device. For example, current DOP 536.3 may include a parameter value corresponding to one DOP of a set of DOPs supported by that data storage device and device profile manager 540, such as a high performance profile (4), a host priority profile (3), a default profile (2), and a maintenance profile (1). Storage device manager 536 may include a DOP command handler 536.5 configured to send device management commands to a data storage device for setting or changing its current DOP setting. For example, DOP command handler 536.5 may generate a device configuration command that includes the DOP parameter value for the desired DOP to be set or changed to and send that DOP command to the target storage device. In some configurations, DOP command handler 536.5 may also be configured to receive a response message from the storage device and update current DOP 536.4 responsive to the storage device confirming the new DOP. In some configurations, the storage device may include operating conditions that enable it to reject a DOP change command and may reply with a rejection message keeping the prior DOP or adopting another DOP, such as a default profile or maintenance profile when background operations have reached a critical threshold.

Storage device monitor 538 may include interfaces, functions, parameters, and/or data structures to collect and/or otherwise determine operating parameters of the storage devices. For example, storage device monitor 538 may be configured to query operating parameters from the data storage device through a device management interface and/or request or receive operating data, such as storage management and reporting technology (SMART) data logs. In some configurations, storage device monitor 538 may be configured to measure host I/O latency. For example, storage device monitor 538 may be configured to track when a host storage command issued to a storage device and a completion notification for that command is received. This measurement may provide a total or average command latency that includes both the interface latency and any processing latency. In configurations, storage device monitor 538 may be configured to measure interface latency 538.2. For example, storage device monitor 538 may be configured to ping the device-side interface without substantial processing by the storage device. This measurement may provide a total or average interface latency corresponding to interface speed. Based on comparing the command latency to the interface latency, storage device monitor 538 may determine a total or average processing latency corresponding to processing speed.

In some configurations, storage device monitor 538 may be configured to determine SLC/MLC availability. For example, SLC and MLC capacity and current fill levels may be reportable operating parameters of the storage devices and may be provided to storage device monitor 538 based on an operating log query and/or operating metrics reporting from each storage device. SLC (fast storage) and MLC (slower storage) and their fill levels may correspond to current processing speeds and/or current or predicted need for background operations for data migration, garbage collection, and/or data scrub. In some configurations, storage device monitor 538 may include a background state 538.4 configured to determine the current level of and/or need for background operations by the storage device. For example, storage device monitor 538 and/or the storage device may maintain a set of background operation parameters and corresponding thresholds to trigger background operations, such as data migration, garbage collection, defragmentation, wear leveling, and/or a data scrub that combines several of these operations. A storage device may report background parameters and/or an aggregate background state based on those parameters to enable storage device monitor 538 to quantify the impact of background operations on current processing speed and/or predict background parameter thresholds that may trigger changes in processing speed. In some configurations, one or more of the storage device parameters determined by storage device monitor 538 may be used by device profile manager 540 to determine DOP selection and operating periods for changing DOP selections.

Device profile manager 540 may include interface protocols and a set of functions, parameters, and/or data structures for using of DOPs to manage performance of the virtual storage pool. For example, device profile manager 540 may be configured with a set of DOPs to be used to manage the operating parameters of the storage devices and the logic for assigning those DOPs during different operating periods. Device profile manager 540 may be configured to interface with storage device interface 534 for issuing DOP commands to the storage devices and/or determining storage device operating parameters that may impact DOP selection and operating period changeover. Device profile manager 540 may include hardware and/or software modules configured to use processor 512 and memory 514 for executing specific functions of device profile manager 540. For example, device profile manager 540 may include device operational profiles 542, device throughput predictor 544, and performance manager 546.

Device operational profiles 562 may include interfaces, functions, parameters, and/or data structures configured to manage a library of DOPs for use by the storage devices. In some configurations, each DOP may include a DOP identifier and a set of storge device operating parameters that are modified to configure the storage device to that DOP. For example, device operating parameters may include the allocation of processing resources and/or priority to host storage operations versus background operations and, in some cases, prioritization and/or exclusion of specific host storage operations or background operations. In some configurations, the set of DOPs may include a range of profiles from a maximization of background operations (resulting in the slowest or no host storage operation processing) to a maximization of host storage operations (resulting in the fastest host storage operation processing, but not likely to be sustainable due to the need for background operations).

In one example, the range of profiles may include four steps from no host storage operation processing to exclusive host storage operation processing. High performance profile 542.1 may be defined as the DOP with the highest host storage command performance (processing speed) and may include storage device operating parameters to exclude processing of background operations and give all processing resources to host storage commands received in the host command queues, resulting in maximum supported processing speed. Host priority profile 542.2 may be defined as the DOP with the next highest storage command performance and may include storage device operating parameters to prioritize host storage commands and/or allocate a higher ratio of processing resources to host storage commands. Default profile 542.3 may be defined as the DOP with the second lowest storage command performance and may include storage device operating parameters that follow the storage devices default configuration of prioritization between host storage commands and background operations. Background profile 542.4 may be defined as the DOP with the slowest or, in some configurations, no host storage command processing and may include storage device operating parameters to prioritize background operations over host storage command processing. In some configurations, device operational profiles 542 may be configured with target processing values in terms of IOPS or megabytes per second (MBps). For example, a base value of X MBps may be selected for maintenance profile 542.4 and increments Y may be selected for each increase in performance level, such as default profile 542.3 operating at X+Y MBps, host priority profile 542.2 operating at X+2Y MBps, and high performance profile 542.1 operating at X+3Y MBps or a maximum supported performance for the storage device. Note that in each case, the profiles and their performance may be a percentage of the processing speed or IOPS rating of that storage device as there may be a range of storage device types with different processing capabilities in the virtual storage pool.

Device throughput predictor 544 may include interfaces, functions, parameters, and/or data structures configured to determine or predict the interface speeds and processing speeds of each storage device using each DOP and under various network loads and background operation states. For example, device throughput predictor 544 may use network load and/or storage device data to determine interface speeds and processing speeds for each storage device or set of storage devices based on a combination of network conditions and DOPs. In some configurations, network load and/or storage device data may be received from or accessed through storage device monitor 538 or from another source, such as a network monitor associated with network interface 518. In some configurations, device throughput predictor 544 may include one or more network speed models 544.1 configured to map historical network data to predict network loads over time. For example, network speed models 544.1 may include a time-based model for each network connecting storage devices to the virtual storage pool that includes high load, low load, and transitional or variable operating periods over the course of a time cycle, such as a day or a week. In some configurations, device throughput predictor 544 may include one or more processing speed models 544.2 configured to map background operating parameters to anticipated changes in processing speeds. For example, processing speed models 544.2 may include one or more background parameters, such as SLC fill or valid/invalid fragment count, to predict background operation levels and/or background operation trigger thresholds. Device throughput for any given device may be a combination of the interface speed (based on network speed for network storage devices or fixed for local storage devices) and processing speed (based on baseline processing speed modified by background operations). In some configurations, device throughput predictor 544 may be used by performance manager 546 to determine DOP selection and operating periods for achieving consistent aggregate performance across the virtual storage pool.

Performance manager 546 may include interfaces, functions, parameters, and/or data structures configured to use DOP configurations across the storage devices in the virtual storage pool to maintain a desired aggregate performance level and/or specific service level targets of one or more host systems. For example, performance manager 546 may respond to network load based on real-time network monitoring or using network speed models 544.1 to determine operating periods and the DOPs for each storage device or set of storage devices to achieve a desired aggregate performance threshold. In some configurations, performance manager 546 may include a DOP table or similar data structure configured to identify each DOP available for use for each storage device. For example, the DOP table may include individual storage device identifier and/or group storage devices into sets according to similar storage device characteristics and connection paths and provide corresponding entries for each DOP available for that device set and the corresponding expected processing speed for that DOP. Performance manager 546 may be configured with one or more aggregate performance calculators 546.2 and a corresponding aggregate performance threshold for maintaining a desired service level. For example, a virtual storage pool may be rated for a specific aggregate processing capacity and the aggregate performance threshold may be based on meeting that aggregate processing capacity based on the aggregate processing speeds of all storage devices in the pool.

Performance manager 546 may include DOP selection logic 546.3 configured to determine, for an operating period, which DOPs should be assigned to which storage devices or sets of storage devices. For example, DOP selection logic 546.3 may include one or more rules sets for evaluating the current or predicted network load and the predicted processing speed of each storage device under those network load conditions to determine a best set of DOPs to assign to each set of storage devices to achieve the aggregate performance threshold. Operating period logic 546.4 may determine operating periods based on changes in network load conditions and/or background operation conditions for initiating changes in the current set of DOPs being used. For example, operating period logic 546.4 may determine a change in network load for one or more networks and/or a change in aggregate performance to trigger DOP selection logic 546.3 to determine new DOPs for a next operating period. In some configurations, performance manager 546 may include host load logic 546.5 configured to determine a load balancing configuration for host storage commands to align with the current DOP configuration of the storage devices. For example, host load logic 546.5 may include logic for allocating a number of host connections to storage devices based on their relative allocations of processing speed under their current DOP. Other load balancing schemes, including automated load balancing based on command queue depths, processing latency, and/or other factors may also be used or initiated by host load logic 546.5 and executed by host command handler 532.

Figure 6:
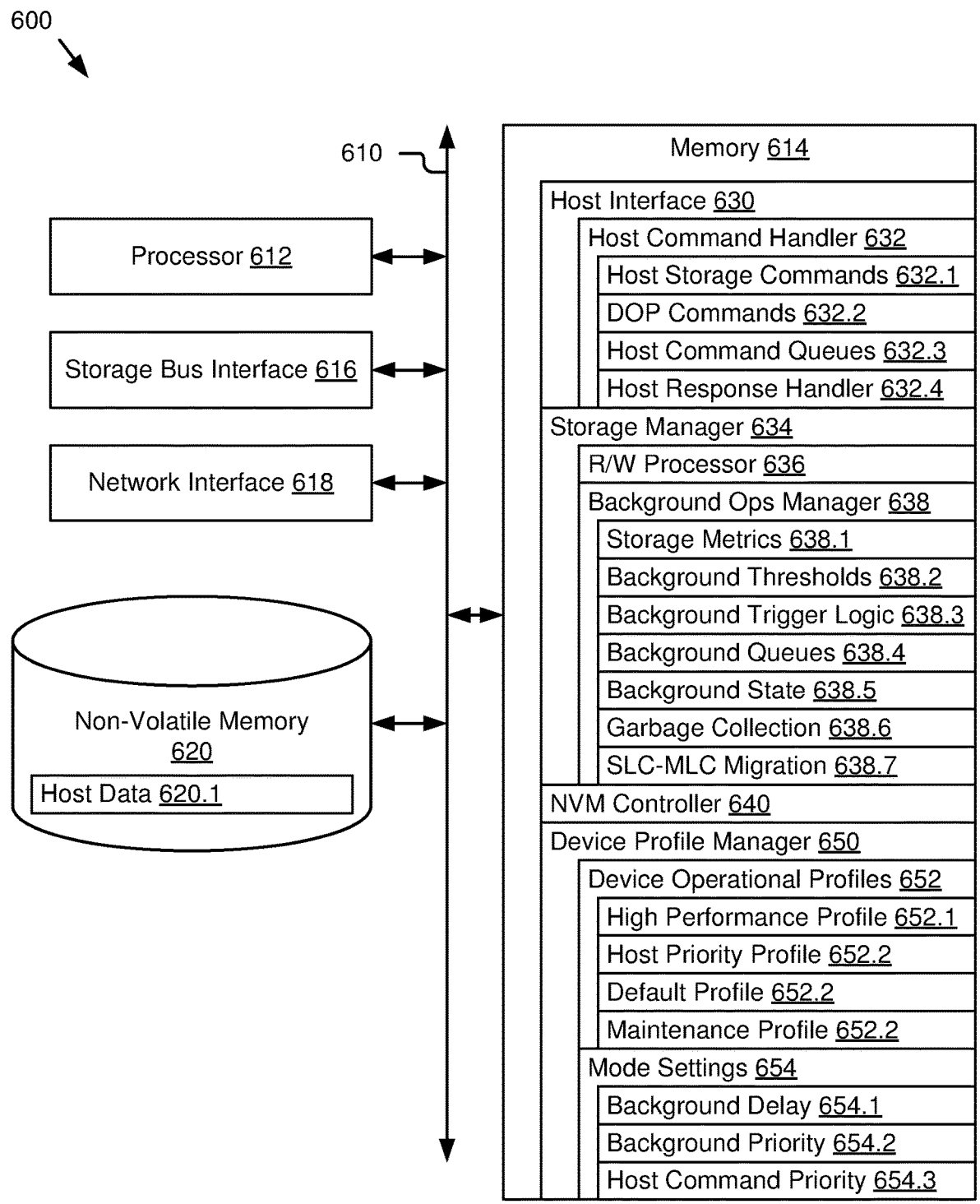
FIG. 6 schematically illustrates some elements of a data storage device of FIGS. 1-3.

FIG. 6 schematically shows selected modules of a storage device 600 configured for changing operation based on DOPs selected by a storage controller, such as a virtual storage manager of storage node 500. Storage device 600 may incorporate elements and configurations similar to those shown in FIGS. 1-2. For example, storage device 600 may be configured as a storage device 120 in a virtual storage pool.

Storage device 600 may include a bus 610 interconnecting at least one processor 612, at least one memory 614, and at least one interface, such as storage bus interface 616 and/or network interface 518. Bus 610 may include one or more conductors that permit communication among the components of storage device 600. Processor 612 may include any type of processor or microprocessor that interprets and executes instructions or operations. Memory 614 may include a random access memory (RAM) or another type of dynamic storage device that stores information and instructions for execution by processor 612 and/or a read only memory (ROM) or another type of static storage device that stores static information and instructions for use by processor 612 and/or any suitable storage element such as reserved capacity in non-volatile memory 620.

Storage bus interface 616 may include a physical interface for connecting to a host and/or storage controller using an interface protocol that supports storage device access. For example, storage bus interface 616 may include a PCIe, SATA, SAS, or similar storage interface connector supporting NVMe access to solid state media comprising non-volatile memory devices 520. Network interface 618 may include a physical interface for connecting to one or more networks via a network interface. For example, network interface 618 may include an ethernet connection to a host bus adapter, network interface, or similar network interface connector supporting NVMe host connection protocols, such as RDMA and TCP/IP connections. In some embodiments, network interface 618 may support NVMeoF or similar storage interface protocols.

Storage device 600 may include one or more non-volatile memory devices 620 configured to store host data 620.1 and, in some configurations, one or more partitions of system data. For example, non-volatile memory devices 520 may include a plurality of flash memory packages organized as an addressable memory array. In some configurations, non-volatile memory devices 520 may include NAND or NOR flash memory devices comprised of single level cells (SLC), multiple level cell (MLC), or triple-level cells. In some configurations, non-volatile memory devices 620 may include both SLC memory for fast storage and MLC for slower storage and/or include a portion of MLC memory that may be written as SLC memory for fast storage.

Storage device 600 may include a plurality of modules or subsystems that are stored and/or instantiated in memory 614 for execution by processor 612 as instructions or operations. For example, memory 614 may include a host interface 630 configured to receive, process, and respond to host data requests from client or host systems. Memory 614 may include a storage manager 634 configured to process host storage commands and background operations through backend storage operations to non-volatile memory 620. Memory 614 may include a non-volatile memory (NVM) controller 640 configured to manage read and write operations to non-volatile memory devices 620, such as the backend storage operations determined by storage manager 634. Memory 614 may include a device profile manager 650 configured to modify operations of storage device 600 based on DOPs received from a virtual storage manager.

Host interface 630 may include an interface protocol and/or set of functions, parameters, and data structures for receiving, parsing, responding to, and otherwise managing host data requests from a host. For example, host interface 630 may include functions for receiving and processing host requests for reading, writing, modifying, or otherwise manipulating data blocks and their respective client or host data and/or metadata in accordance with host communication and storage protocols. Host interface 630 may include a storage interface protocol that defines a set of host storage commands that may be transferred from a host system to storage device 500 using a defined set of functions and syntax. For example, the storage interface protocol may include an interface definition compliant with NVMe standards for receiving host storage commands to a submission queue allocated to a host connection and returning response messages through a completion queue and/or interrupt message passing. A host command handler 632 may be configured to receive and parse host storage commands 532.1 targeting host data 620.1 in non-volatile memory 620. For example, host storage commands 632.1 and/or corresponding host storage operations may be queues in host command queues 632 for subsequent processing by storage manager 634. In some configurations, host command handler 632 may also be configured to receive DOP commands 632.2 for setting or changing the current DOP used by storage device 600. For example, host command handler 632 may parse a new DOP identifier from a configuration command or a parameter in host storage commands 632.1. Host response handler 632.4 may be configured to respond to host message and, more specifically, with confirmation and/or completion messages for host storage commands 632.1 and/or DOP commands 632.2. For example, once a host storage command is processed, a response may be sent to the host through a host completion queue, response message, or interrupt message.

Storage manager 634 may include functions, parameters, data structures, and/or interfaces for receiving and executing host storage commands and background operations targeting host data 620.1 in non-volatile memory 620. For example, storage manager 634 may be configured to receive host storage commands through host interface 630, parse them into backend storage operations, and execute those operations using NVM controller 640. Storage manager 634 may also process background operations and internal storage commands for accessing device data stored in one or more system partitions. Storage manager 634 may include hardware and/or software modules for executing specific functions, such as a read/write processor 636 and background operations manager 638. Read/write processor 636 may include logic for selecting host storage commands and background storage commands from their respective queues and passing corresponding storage operations to NVM controller 640 for execution against non-volatile memory 620. For example, read/write processor 636 may be configured as an interface between host command handler 632, background operations manager 638, and NVM controller 640. Storage manager 634 may include additional functions, such as metadata management and configuration management related to host storage commands and background operations.

Background operations manager 638 may include logic and data structures for managing the background operations of storage device 600. For example, background operations manager 638 may determine when background operations are needed and queue them for processing through read/write processor 636. In some configurations, background operations manager 638 may collect, receive, or access storage metrics 638.1 related to the ongoing storage operations to non-volatile memory 620, such as capacities, memory locations used, valid or invalid fragment counts, endurance values, read/write access metrics, etc. One or more of storage metrics 638.1 may be compared to one or more background operation thresholds 638.2 for determining when background operations should be initiated and/or the priority they should be given. For example, background operation thresholds 638.2 may include an available capacity threshold or invalid fragment threshold to trigger migration of SLC data to MLC (SLC/MLC migration 638.7) or garbage collection 638.6 of deleted or otherwise invalid blocks and consolidation of valid blocks to free up capacity to be rewritten. Background trigger logic 638.3 may include a set of rules for determining different types of background operations and when they should be added to background queues 638.4 based on background operation thresholds 638.2. Background queues 638.2 may operate similarly to host command queues 632.3 and hold background operation commands in first-in-first-out order for processing through read/write (R/W) processor 636 and NVM controller 640. In some configurations, background queues 638.2 may be configured with priority parameters relative to one another (for prioritizing different types of background operations) and/or host command queues 632.3 that enable storage manager 634 to control the relative use of processor and NVM resources for different types of operations. In some configurations, background operations manager 638 may determine one or more background states 638.5 that are available to other components or systems for monitoring operation of storage device 600. For example, background states 638.5 may reflect evaluation of background thresholds 638.2 by background trigger logic 638.3 and/or queue depths of background queues 638.4 to determine whether and when one or more background states may change from unnecessary, to normal maintenance, to critical maintenance levels.

NVM controller 640 may include functions, parameters, data structures, and/or interfaces for reading, writing, and deleting data units in non-volatile memory devices 620. For example, NVM controller 640 may include functions for executing host data operations related to host storage commands received through host interface 630. For example, PUT or write commands may be configured to write host data units to non-volatile memory devices 620. GET or read commands may be configured to read data from non-volatile memory devices 620. DELETE commands may be configured to delete data from non-volatile memory devices 620, or at least mark a data location for deletion until a future garbage collection or similar operation actually deletes the data or reallocates the physical storage location to another purpose. In some configurations, NVM controller 640 may include flash translation layer (FTL) management, data state machine, read/write buffer management, NVM device interface protocols, NVM device configuration/management/maintenance, and other device-side functions.

Device profile manager 650 may include functions, parameters, data structures, and/or interfaces for changing storage device operations based on a DOP assigned to storage device 600. For example, device profile manager 650 may receive a new active DOP identifier from host command handler 632 and change mode settings 654 for that device operating profile 562. A set of profiles may be configured for storage device 600 and stored in device profile manager 650 to be initiated through DOP commands. In one example, the set of profiles may include four steps from no host storage operation processing to exclusive host storage operation processing. High performance profile 652.1 may be defined as the DOP with the highest host storage command performance (processing speed) and may include storage device operating parameters to exclude processing of background operations and give all processing resources to host storage commands received in the host command queues, resulting in maximum supported processing speed. Host priority profile 652.2 may be defined as the DOP with the next highest storage command performance and may include storage device operating parameters to prioritize host storage commands and/or allocate a higher ratio of processing resources to host storage commands. Default profile 652.3 may be defined as the DOP with the second lowest storage command performance and may include storage device operating parameters that follow the storage devices default configuration of prioritization between host storage commands and background operations. Background profile 652.4 may be defined as the DOP with the slowest or, in some configurations, no host storage command processing and may include storage device operating parameters to prioritize background operations over host storage command processing. Storage device 600 may operate according to one of these profiles at any given time.

Mode settings 654 may include logic for implementing operating parameter changes to support a new DOP. For example, each time the current DOP for storage device 600 changes, Mode settings 654 may determine the operating parameter changes to be made for the new DOP and send internal calls, such as to storage manager 634, to adjust the operating parameter. In some configurations, one or more DOPs may use background delay 654.1 to reduce the background operations allowed for storage device 600 to free up storage processing for host storage commands. For example, background delay 654.1 may suspend some types of background operations and/or raise the background thresholds for triggering background operations. In some configurations, background delay 654.1 may prevent all background operations in a high performance mode until one or more critical background thresholds are reached that would prevent further operation of the storage device. In some configurations, one or more DOPs may use background priority 654.2 and host command priority 554.3 to control relative processor usage of background operations and host command operations. For example, the processing capability may be divided according to the host processing commitment (MBps) of the DOP compared to the total processing capability of the device. Priority parameters in read/write processor 636 may be adjusted to manage the selection of operations from host command queues 632.3 and background queues 638.4 based on a priority or processing ratio between background operations and host command operations. Other configurations for adjusting operating parameters to throttle background operations or host storage operations to implement each DOP may be used.

Figure 7:
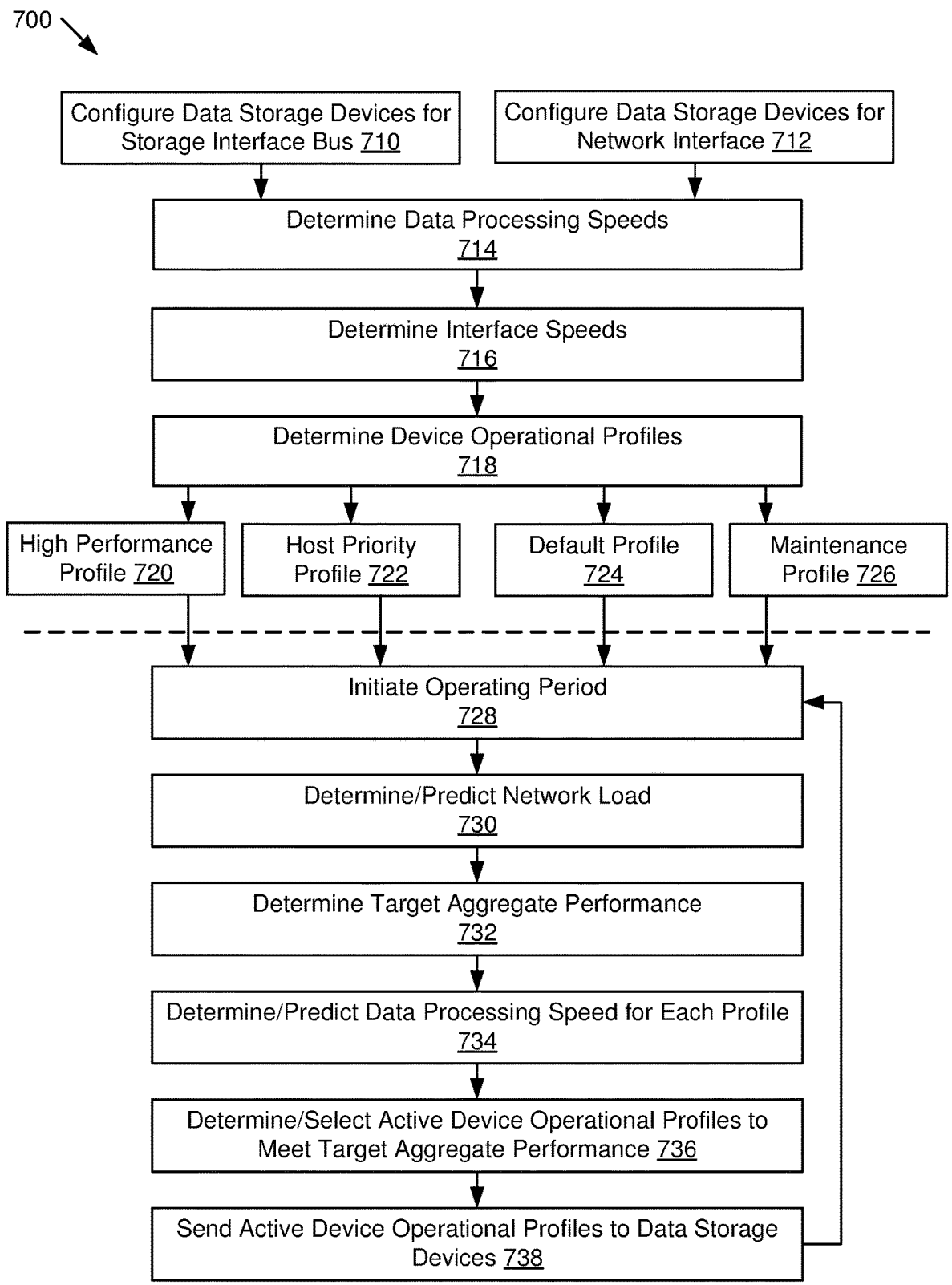
FIG. 7 is a flowchart of an example method of configuring and using device operational profiles to manage virtual storage pool performance as a virtual storage manager.

As shown in FIG. 7, storage node 500 may be operated according to an example method for configuring and using device operational profiles to manage virtual storage pool performance as a virtual storage manager, i.e., according to method 700 illustrated by blocks 710-738 in FIG. 7. Blocks 710-726 may describe configuration of the virtual storage manager and block 728-738 may describe use of the configuration for runtime management of virtual storage pool performance.

At block 710, data storage device communication may be configured for a storage interface bus. For example, the virtual storage manager may be connected to a set of local data storage devices through a storage bus interface.

At block 712, data storage device communication may be configured for a network interface. For example, the virtual storage manager may be connected to a set of network data storage devices through a network interface.

At block 714, data processing speeds may be determined for the data storage devices. For example, each data storage device may include a processing speed characteristic as part of its specification and this may be configured in or determined by the virtual storage manager.

At block 716, interface speeds may be determined for the data storage devices. For example, each data storage device may support a maximum interface speed based on its interface type and connection, such as storage interface speeds and network interface speeds.

At block 718, device operational profiles may be determined. For example, a set of DOPs may be defined for each data storage device based on its data processing speeds, interface speeds, and connection type (network versus local). For example, a high performance profile may be configured at block 720, a host priority profile may be configured at block 722, a default profile may be configured at block 724, and a maintenance profile may be configured at block 726.

At block 728, an operating period may be initiated. For example, the virtual storage manager may initiate an operating period using a selected combination of DOPs to maintain performance and/or prepare for future performance needs.

At block 730, a network load may be determined or predicted. For example, the virtual storage manager may use real-time network monitoring and/or a network speed model to determine a change in network load for the operating period.

At block 732, a target aggregate performance may be determined. For example, the virtual storage manager may be configured to support defined service levels and a corresponding aggregate processing threshold.

At block 734, a host data processing speed may be determined or predicted for each profile. For example, the virtual storage manager may include processing speed ratings for each combination of DOP and set of storage devices to use for predicted data processing speeds.

At block 736, active device operational profiles may be determined or selected to meet the target aggregate performance. For example, the virtual storage manager may evaluate the DOPs for the sets of storage devices, network bandwidth limitations, and background operation needs to select a best set of DOPs for a predicted throughput value achieving the aggregate performance threshold while managing background operations for future operating periods.

At block 738, active device operational profiles may be sent to the data storage devices. For example, the virtual storage manager may generate and send DOP commands for setting or updating the active DOP of each data storage device based on the set of DOPs determined at block 738. Operation may continue using those DOPs during the current operating period until a next operating period is initiated by returning to block 728.

Figure 8:
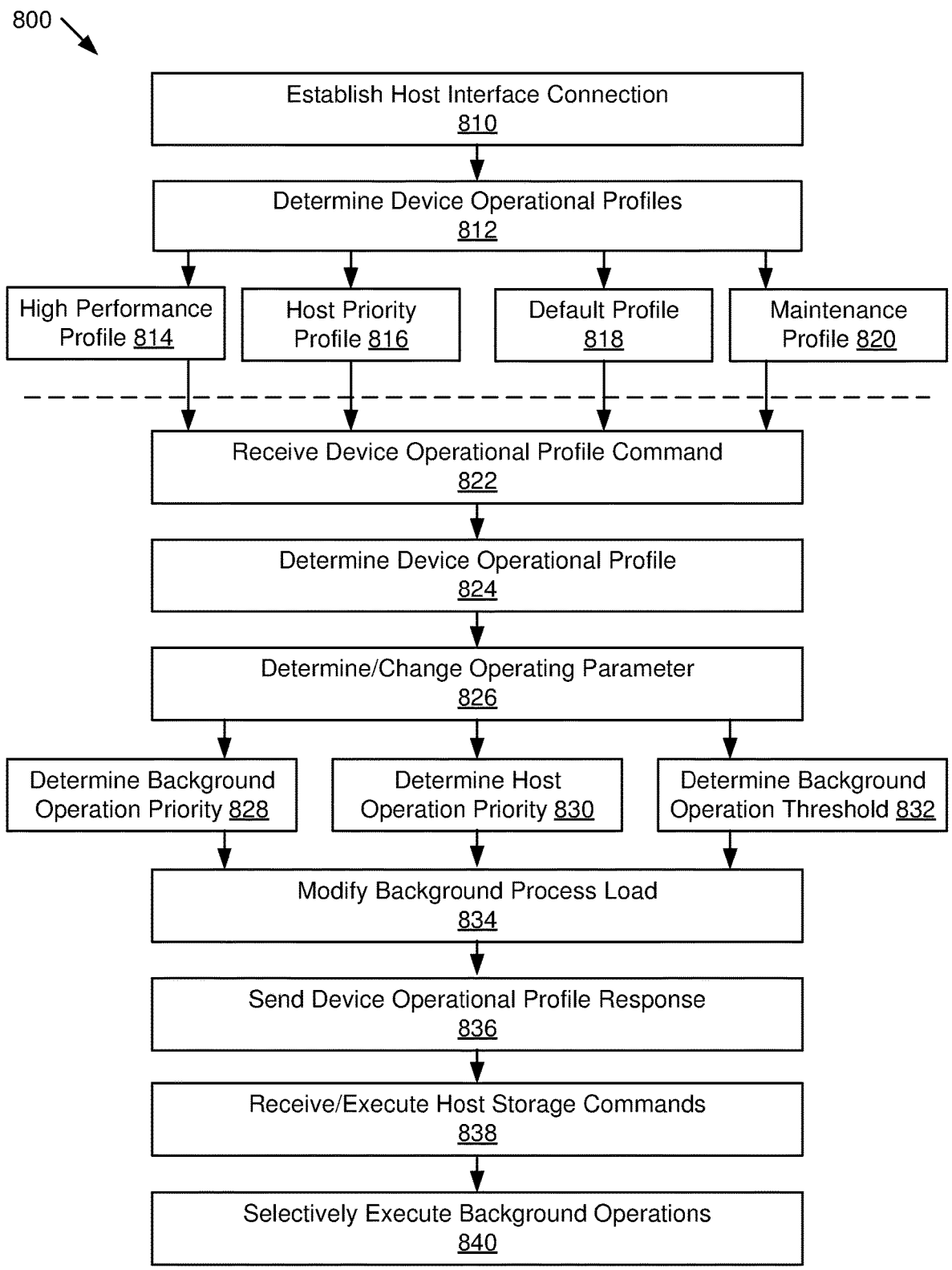
FIG. 8 is a flowchart of an example method of configuring and using device operation profiles to modify operation of a data storage device.

As shown in FIG. 8, storage device 600 may be operated according to an example method for configuring and using device operation profiles to modify operation of a data storage device, i.e., according to method 800 illustrated by blocks 810-840 in FIG. 8. Blocks 810-820 may describe configuration of the data storage device and block 822-840 may describe use of the configuration for runtime management of the active DOP for the data storage device.

At block 810, a host interface connection may be established for the data storage device. For example, the data storage device may be connected to a storage interface bus with a local storage interface bus connection to the virtual storage manager or connected through a network interface and corresponding connection.

At block 812, device operational profiles may be determined. For example, a set of DOPs may be defined for the data storage device based on its data processing speed, interface speed, and connection type (network versus local). For example, a high performance profile may be configured at block 814, a host priority profile may be configured at block 816, a default profile may be configured at block 818, and a maintenance profile may be configured at block 820.

At block 822, device operational profile command may be received. For example, the data storage device may receive a DOP command from the virtual storage manager.

At block 824, a device operational profile may be determined. For example, a DOP identifier may be parsed from the DOP command corresponding to one of the DOPs defined at blocks 812-820.

At block 826, an operating parameter may be determined and changed. For example, based on the new DOP, the data storage device may determine one or more operating parameters that should be updated to modify operation of the data storage device.

At block 828, a background operation priority may be determined. For example, the data storage device may adjust a background operation priority parameter to change the processor priority given to one or more types of background operations.

At block 830, a host operation priority may be determined. For example, the data storage device may adjust a host storage operation priority parameter to change the processor priority given to one or more types of host storage commands.

At block 832, a background operation threshold may be determined. For example, the data storage device may adjust a background threshold value for triggering one or more background operations to modify the background operations queued for processing.

At block 834, the background process load may be modified. For example, based on operating parameter adjustments to operation priorities and/or thresholds, the data storage device may delay, accelerate, increase or decrease the volume of background operations being processed.

At block 836, a device operational profile response may be sent. For example, responsive to changing the DOP, the data storage device may send a response message to the virtual storage manager.

At block 838, host storage commands may be received and executed. For example, the data storage device may receive and execute host storage commands from one or more hosts as directed by the virtual storage manager.

At block 840, background operations may be selectively executed. For example, the data storage device may execute background operations as processor bandwidth is available according to the prioritization and/or thresholds defined by the DOP.

Figure 9:
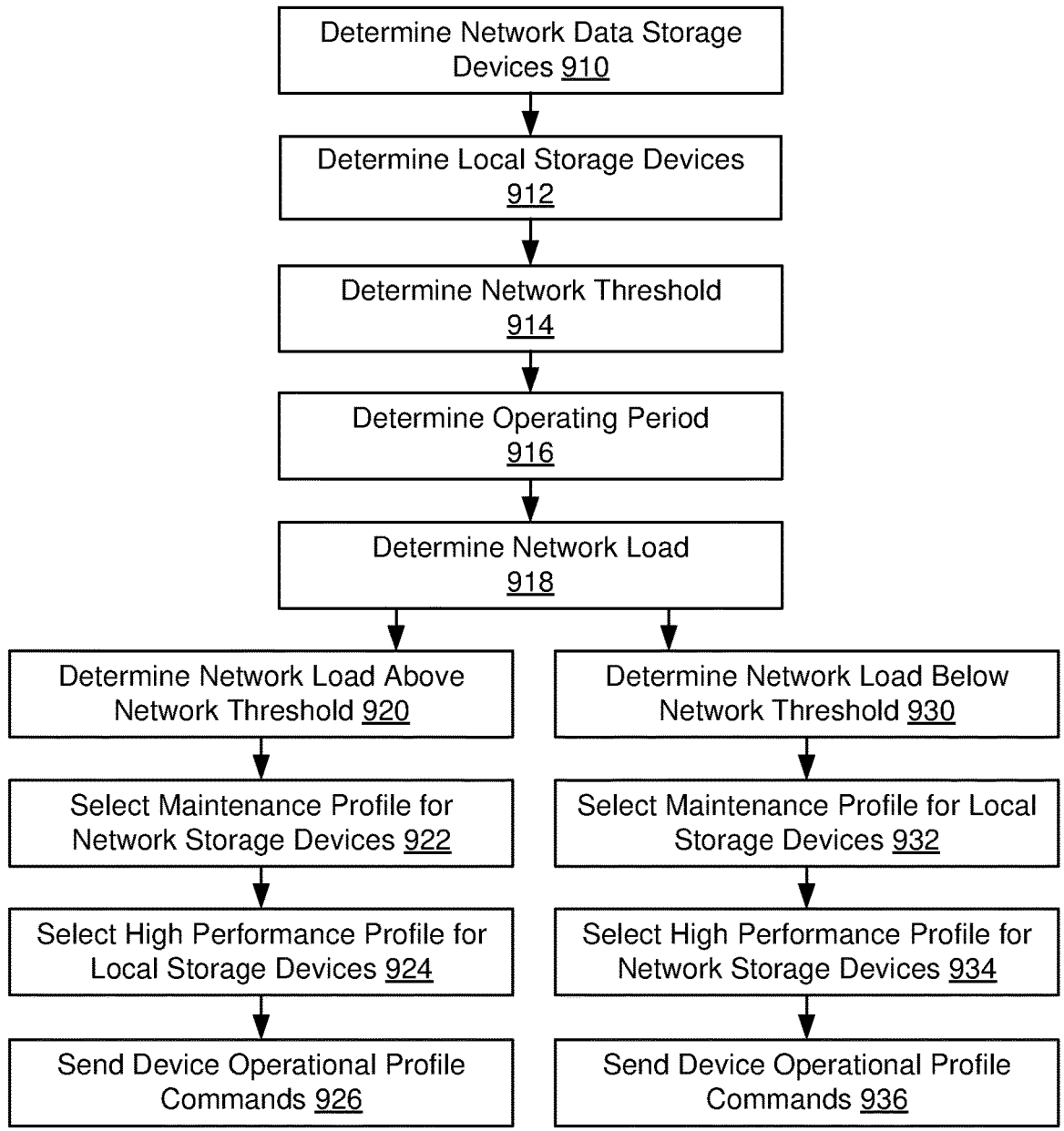
FIG. 9 is a flowchart of an example method of using device operational profiles to respond to different network loads.

As shown in FIG. 9, storage node 500 may be operated according to an example method for using device operational profiles to respond to different network loads, i.e., according to method 900 illustrated by blocks 910-936 in FIG. 9.

At block 910, network data storage devices may be determined. For example, the virtual storage manager may include network connections to at least one set of data storage devices.

At block 912, local storage devices may be determined. For example, the virtual storage manager may include local storage interface bus connections to at least one other set of data storage devices.

At block 914, a network threshold may be determined. For example, the virtual storage manager may be configured with at least one network threshold defining when the network load is impacting the effective interface speed of the network data storage devices and thereby throttling the host storage command processing available from those data storage devices.

At block 916, an operating period may be determined. For example, the virtual storage manager may determine an operating period from initialization of storage operations and between various changes in operating conditions, such as changes in network load.

At block 918, a network load may be determined. For example, the virtual storage manager may determine the network load based on real-time network monitoring and/or a network speed model.

At block 920, the network load may be determined to be above the network threshold. For example, the virtual storage manager may determine that the network load has exceeded a high network load threshold indicating that network storage devices are constrained by the interface speed through the network.

At block 922, a maintenance profile may be selected for network storage devices. For example, the DOPs for the set of network storage devices may include a maintenance profile that reduces or eliminates host storage command processing and prioritizes background operation processing to complete outstanding device maintenance and prepare the storage devices for higher performance in a future operating period.

At block 924, a high performance profile may be selected for local storage devices. For example, the DOPs for the set of local storage devices may include a high performance profile that prioritizes host storage command processing and reduces or eliminates background operation processing to allow the local storage devices to compensate for the host storage commands not being handled by the network storage devices.

At block 926, device operational profile commands may be sent to both sets of storage devices. For example, the virtual storage manager may send DOP commands corresponding to the selected DOPs to each storage device in each set of storage devices.

At block 930, the network load may be determined to be below the network threshold. For example, the virtual storage manager may determine that the network load has fallen below a low network load threshold indicating that network storage devices are not constrained by the interface speed through the network.

At block 932, a maintenance profile may be selected for local storage devices. For example, the DOPs for the set of local storage devices may include a maintenance profile that reduces or eliminates host storage command processing and prioritizes background operation processing to complete outstanding device maintenance that may have been delayed during a prior operating period and may prepare the storage devices for high performance during a future operating period.

At block 934, a high performance profile may be selected for network storage devices. For example, the DOPs for the set of network storage devices may include a high performance profile that prioritizes host storage command processing and reduces or eliminates background operation processing to allow the network storage devices to compensate for the host storage commands not being handled by the local storage devices.

At block 936, device operational profile commands may be sent to both sets of storage devices. For example, the virtual storage manager may send DOP commands corresponding to the selected DOPs to each storage device in each set of storage devices.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
 a processor;
 a memory;
 a plurality of interface connections to a plurality of data storage devices, wherein each data storage device of the plurality of data storage devices is configured with:
  a data processing speed;
  an interface speed; and
  a background process load; and
 a virtual storage manager configured to:
  determine, based on a comparison of the data processing speed and the interface speed of each data storage device of the plurality of data storage devices, an active device operational profile for each data storage device of the plurality of data storage devices; and
  send, to each data storage device of the plurality of data storage devices, the active device operational profile, wherein each data storage device of the plurality of data storage devices is configured to change at least one operating parameter responsive to the active device operational profile for that data storage device.

2. The system of claim 1, wherein the at least one operating parameter changed responsive to the active device operational profile modifies the background process load of that data storage device during an operating period of the active device operational profile.

3. The system of claim 2, wherein the at least one operating parameter changed is a threshold value for triggering background operations.

4. The system of claim 1, wherein:
 a first set of data storage devices from the plurality of data storage devices is configured for connection, through a first network, to a network interface of the plurality of interface connections;
 a second set of data storage devices from the plurality of data storage devices is configured for connection, through a storage interface bus, to a storage interface of the plurality of interface connections;
 the interface speed of each data storage device in the first set of data storage devices is based on a network load of the first network; and
 the interface speed of each data storage device in the second set of data storage devices is based on a storage interface speed of a storage bus interface of that data storage device.

5. The system of claim 4, wherein the virtual storage manager is further configured to determine, based on a network speed model, the interface speed of each data storage device in the first set of data storage devices.

6. The system of claim 1, wherein
 the virtual storage manager is further configured to:
  determine, for each data storage device of the plurality of data storage devices, at least two device operational profiles selected from:
   a high performance profile; and a maintenance profile; and
determine, for each device operational profile of each data storage device, a predicted data processing speed for that data storage device using that device operational profile; and
determining the active device operational profile for each data storage device of the plurality of data storage devices is based on the predicted data processing speed for that data storage device using that device operational profile.

7. The system of claim 6, wherein the virtual storage manager is further configured to:
determine a target aggregate performance value for the plurality of data storage devices;
determine, for each data storage device of the plurality of data storage devices, a predicted throughput value based on the interface speed for that data storage device and the predicted data processing speed for that data storage device; and
select the active device operational profiles for an operating period such that an aggregate predicted throughput value for the plurality of data storage devices meets the target aggregate performance value.

8. The system of claim 6, wherein the virtual storage manager is further configured to:
determine, for an operating period, a network load above a network threshold impacting the interface speeds of a first set of data storage devices of the plurality of data storage devices;
determine, for the operating period, a second set of data storage devices of the plurality of data storage devices configured for connection, through a storage interface bus, to a storage interface of the plurality of interface connections;
select the maintenance profile as the active device operational profile for the first set of data storage devices; and
select the high performance profile as the active device operational profile for the second set of data storage devices.

9. The system of claim 6, wherein the virtual storage manager is further configured to:
determine, for an operating period, a network load below a network threshold impacting the interface speeds of a first set of data storage devices of the plurality of data storage devices;
determine, for the operating period, a second set of data storage devices of the plurality of data storage devices configured for connection, through a storage interface bus, to a storage interface of the plurality of interface connections;
select the maintenance profile as the active device operational profile for the second set of data storage devices; and
select the high performance profile as the active device operational profile for the first set of data storage devices.

10. The system of claim 1, further comprising the plurality of data storage devices, wherein each data storage device comprises:
a non-volatile storage medium; and
a controller configured to:
receive a device operational profile command indicating the active device operational profile;
determine, based on the active device operational profile and a prior device operational profile, the at least one operating parameter to change;
change the at least one operating parameter; and
send a response to the device operational profile command confirming the active device operational profile.

11. A computer-implemented method, comprising:
configuring each data storage device of a plurality of data storage devices in a virtual storage pool, wherein each data storage device has a corresponding:
data processing speed;
interface speed; and
background process load;
determining, based on a comparison of the data processing speed and the interface speed of each data storage device of the plurality of data storage devices, an active device operational profile for each data storage device of the plurality of data storage devices;
sending, to each data storage device of the plurality of data storage devices, the active device operational profile; and
changing, by each data storage device of the plurality of data storage devices, at least one operating parameter responsive to the active device operational profile for that data storage device.

12. The computer-implemented method of claim 11, further comprising, for each data storage device of the plurality of data storage devices:
modifying, responsive to the at least one operating parameter changed responsive to the active device operational profile for that data storage device, the background process load of that data storage device during an operating period of the active device operational profile.

13. The computer-implemented method of claim 11, further comprising:
configuring a first set of data storage devices from the plurality of data storage devices for connection to a host system, through a first network, to a network interface for receiving host storage commands, wherein the interface speed of each data storage device in the first set of data storage devices is based on a network load of the first network; and
configuring a second set of data storage devices from the plurality of data storage devices for connection to a host storage system, through a storage interface bus, to a storage interface for receiving host storage commands, wherein the interface speed of each data storage device in the second set of data storage devices is based on a storage interface speed of a storage bus interface of that data storage device.

14. The computer-implemented method of claim 13, further comprising:
determining, based on a network speed model, the interface speed of each data storage device in the first set of data storage devices.

15. The computer-implemented method of claim 11, further comprising:
determining, for each data storage device of the plurality of data storage devices; at least two device operational profiles selected from:
a high performance profile; and
a maintenance profile; and
determining, for each device operational profile of each data storage device, a predicted data processing speed for that data storage device using that device operational profile, wherein determining the active device operational profile for each data storage device of the plurality of data storage devices is based on the predicted data processing speed for that data storage device using that device operational profile.

16. The computer-implemented method of claim 15, further comprising:
    determining a target aggregate performance value for the plurality of data storage devices;
    determining, for each data storage device of the plurality of data storage devices, a predicted throughput value based on the interface speed for that data storage device and the predicted data processing speed for that data storage device; and
    selecting the active device operational profiles for an operating period such that an aggregate predicted throughput value for the plurality of data storage devices meets the target aggregate performance value.

17. The computer-implemented method of claim 15, further comprising:
    determining, for an operating period, a network load above a network threshold impacting the interface speeds of a first set of data storage devices of the plurality of data storage devices;
    determining, for the operating period, a second set of data storage devices of the plurality of data storage devices configured for connection, through a storage interface bus, to a storage interface;
    selecting the maintenance profile as the active device operational profile for the first set of data storage devices; and
    selecting the high performance profile as the active device operational profile for the second set of data storage devices.

18. The computer-implemented method of claim 15, further comprising:
    determining, for an operating period, a network load below a network threshold impacting the interface speeds of a first set of data storage devices of the plurality of data storage devices;
    determining, for the operating period, a second set of data storage devices of the plurality of data storage devices configured for connection, through a storage interface bus, to a storage interface;
    selecting the maintenance profile as the active device operational profile for the second set of data storage devices; and
    selecting the high performance profile as the active device operational profile for the first set of data storage devices.

19. The computer-implemented method of claim 11, further comprising:
    receiving, by each data storage device of the plurality of data storage devices, a device operational profile command indicating the active device operational profile;
    determining, by each data storage device of the plurality of data storage devices, the at least one operating parameter to change based on the active device operational profile and a prior device operational profile;
    changing, by each data storage device of the plurality of data storage devices, the at least one operating parameter; and
    sending, by each data storage device of the plurality of data storage devices, a response to the device operational profile command confirming the active device operational profile.

20. A storage system comprising:
    a processor;
    a memory;
    a plurality of data storage devices;
    a plurality of interface connections to the plurality of data storage devices, wherein each data storage device of the plurality of data storage devices is configured with:
        a data processing speed;
        an interface speed; and
        a background process load;
    means for determining, based on a comparison of the data processing speed and the interface speed of each data storage device of the plurality of data storage devices, an active device operational profile for each data storage device of the plurality of data storage devices;
    means for sending, to each data storage device of the plurality of data storage devices, the active device operational profile; and
    means for changing, by each data storage device of the plurality of data storage devices, at least one operating parameter responsive to the active device operational profile for that data storage device.

\* \* \* \* \*